United States Patent
Rainouard et al.

(10) Patent No.: US 12,332,470 B2
(45) Date of Patent: Jun. 17, 2025

(54) DEVICE FOR PROJECTING AN IMAGE INTO THE EYE OF A USER

(71) Applicant: Commissariat A L'Energie Atomique et aux Energies Alternatives, Paris (FR)

(72) Inventors: Fabian Rainouard, Grenoble (FR); Christophe Martinez, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 515 days.

(21) Appl. No.: 17/741,784

(22) Filed: May 11, 2022

(65) Prior Publication Data
US 2022/0381968 A1    Dec. 1, 2022

(30) Foreign Application Priority Data

May 12, 2021    (FR) ..................... 21 05017

(51) Int. Cl.
*G02B 6/00*    (2006.01)
*F21V 8/00*    (2006.01)
(Continued)

(52) U.S. Cl.
CPC ......... *G02B 6/005* (2013.01); *G02B 27/0172* (2013.01); *G02F 1/292* (2013.01); *G02B 2027/0178* (2013.01)

(58) Field of Classification Search
CPC ............... G02B 6/005; G02B 27/0172; G02B 2027/0178; G02B 2027/0174;
(Continued)

(56) References Cited

U.S. PATENT DOCUMENTS

2014/0204455 A1*    7/2014    Popovich ........... G02B 27/0172
                                                        359/567
2015/0370073 A1*   12/2015    Martinez .............. G02B 6/0036
                                                        359/630
(Continued)

FOREIGN PATENT DOCUMENTS

FR            3 022 642 A1       12/2015

OTHER PUBLICATIONS

Preliminary French Search Report issued Jan. 12, 2022 in French Application 21 05017 filed on May 12, 2021, 10 pages (with English Translation of Categories of Cited Documents & Written Opinion).
(Continued)

*Primary Examiner* — Henry Duong
(74) *Attorney, Agent, or Firm* — Oblon, McClelland, Maier & Neustadt, L.L.P.

(57) ABSTRACT

Device for projecting an image onto an eye, the device comprising a stack comprising light guides, each light guide being coupled to a plurality of diffraction gratings, electrodes, each electrode being associated with a plurality of diffraction gratings of various light guides, each electrode being configured to activate each diffraction grating with which it is associated, a holographic film, the device being characterized in that each light guide extends along a longitudinal axis, in such a way as to form rectilinear segments, two successive rectilinear segments of a given light guide making two different acute angles to the longitudinal axis.

19 Claims, 8 Drawing Sheets

(51) Int. Cl.
*G02B 27/01* (2006.01)
*G02F 1/29* (2006.01)

(58) Field of Classification Search
CPC ............... G02B 6/0035; G02B 5/1819; G02B 2027/0105; G02B 27/01; G02B 27/0101; G02B 27/0103; G02B 27/0149; G02B 27/017; G02B 27/0176; G02B 27/0179; G02B 27/0189; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02F 1/292; G02F 1/313; G02F 2201/305
USPC ........................................................... 359/630
See application file for complete search history.

(56) References Cited

U.S. PATENT DOCUMENTS

2016/0004090 A1    1/2016  Popovich et al.
2020/0249491 A1    8/2020  Popovich et al.

OTHER PUBLICATIONS

Rainouard et al., "Improved mathematical model for a dense network of waveguide and electrode design", Proceedings of SPIE, vol. 11689, Mar. 5, 2021, 10 pages.

* cited by examiner

DEVICE FOR PROJECTING AN IMAGE INTO THE EYE OF A USER

TECHNICAL FIELD

The technical field of the invention relates to projection of an image onto an eye, in applications such as augmented reality.

PRIOR ART

Wearable augmented-reality devices, such as glasses, allow a real scene to be observed while complementary information is viewed. This type of device is frequently based on micro-displays, allowing an image to be formed in immediate proximity to an eye of a user. Such micro-displays may for example be integrated into a pair of glasses. An optical system, comprising a set of lenses, allows a clear image to be perceived by the eye.

U.S. Pat. No. 9,632,317 describes a device allowing projection, onto the retina of the eye, without display or optical system. The device comprises a transparent integrated optical circuit composed of an array of nanoscale light guides, of an array of electrodes and of a holographic film. Such a device is compact, and allows a large field of view to be obtained. In addition, it makes it possible not to use bulky optical systems of complex design.

The nanoscale light guides allow a set of emission points to be defined on the holographic film, each point being capable of being illuminated by light extracted from one light guide. The set of emission points is subdivided into various subsets, each subset comprising emission points distributed, as randomly as possible, over the holographic film. The emission points of a given subset may be simultaneously illuminated by various light guides. Under the effect of illumination, each emission point of the same subset emits a light wave that propagates in the same direction to the pupil of the eye, so as to form a single spot of light on the retina. In this way, each subset of emission points allows a pixel of the image perceived by the user to be formed. An image may be formed by successively illuminating various subsets of points, so as to form an image comprising a high number of pixels. The frequency of illumination of each subset of points is set so that, under the effect of persistence of vision, the user may experience a fixed image, despite the sequential formation of the various pixels of the image.

As indicated above, it is preferable, in a given subset, for the emission points to be distributed as randomly as possible, so as to avoid Moiré effects during the formation of the image on the retina.

In U.S. Pat. No. 9,632,317, light is extracted from each light guide by placing, over the length of the light guide, electrically modulatable diffraction gratings. The diffraction gratings are spaced apart from one another and define point-like light-extracting regions. Under the effect of an electrical activation, each diffraction grating allows light propagating through one light guide to be extracted. In U.S. Pat. No. 9,632,317, the light guides are of sinusoidal shape, and extend parallel to one another.

The inventors provide an optimized configuration, so as to increase the density of emission points capable of being activated, while preserving a pseudo-random distribution. Specifically, the higher the density of emission points, the higher the number of pixels in the formed image. This allows the amount of information contained in each image to be increased.

SUMMARY OF THE INVENTION

A first subject of the invention is a device for projecting an image onto an eye, the device comprising a stack comprising:
light guides, each light guide being coupled to a plurality of diffraction gratings, which are distributed over the length of the light guide, each diffraction grating being electrically modulatable, each diffraction grating being configured to be electrically modulated so as to extract light propagating through the light guide;
electrodes, each electrode being associated with a plurality of diffraction gratings coupled to various light guides, respectively, each electrode being configured to modulate each diffraction grating with which it is associated;
the device comprising various emission points distributed over the length of the emission area, each emission point corresponding to an association between one electrode and one diffraction grating coupled to one light guide;
wherein:
each light guide extends in such a way as to form rectilinear segments, two successive rectilinear segments of a given light guide making two different acute angles to a longitudinal axis, respectively;
rectilinear segments of various light guides are placed parallel to one another, but notably offset from one another in a direction perpendicular to the longitudinal axis.

Thus, the longitudinal axis may be divided into a plurality of longitudinal slices, the emission area being segmented into longitudinal strips, each longitudinal strip extending perpendicular to one longitudinal slice. Along the length of a given longitudinal strip, the rectilinear segments of various light guides are parallel to one another.

According to one embodiment:
the emission area is bounded by a border;
some light guides are parallel to one another, in a direction secant to the border;
at least one light guide extends parallel to the border.

According to one embodiment, the acute angles made by two successive rectilinear segments of a light guide, to the longitudinal axis, are of opposite signs. The acute angles made by successive rectilinear segments of a light guide, to the longitudinal axis, may have the same absolute value.

The acute angle, made by each rectilinear segment of a light guide, to the longitudinal axis, is comprised between 20° and 45° in absolute value.

The density of rectilinear segments may be comprised between 0.5 and 5 segments per mm along the longitudinal axis.

At least two rectilinear segments of a given light guide may extend over two different lengths, respectively.

According to one embodiment:
each electrode extends in such a way as to form rectilinear segments, two successive rectilinear segments of a given electrode making two different acute angles to a lateral axis, respectively;
rectilinear segments of various electrodes are placed parallel to one another, but notably offset from one another in a direction perpendicular to the lateral axis.

Thus, the lateral axis may be divided into a plurality of lateral slices, the emission area being segmented into lateral strips, each lateral strip extending perpendicular to one lateral slice. Along the length of a given lateral strip, the rectilinear segments of various electrodes are parallel to one another.

According to one possibility:
the emission area is bounded by a border;
segments of electrodes are parallel to one another, in a direction secant to the border;
at least one segment of an electrode extends parallel to the border.

The acute angles made by the successive rectilinear segments of an electrode, to the lateral axis, may have opposite signs. The acute angles made by two successive rectilinear segments of an electrode, to the lateral axis, may have the same absolute value.

The acute angle, made by each rectilinear segment of an electrode, to the lateral axis, is comprised between 20° and 45° in absolute value.

Each electrode may comprise a density of rectilinear segments comprised between 0.5 and 5 segments per mm along the lateral axis.

At least two rectilinear segments of a given electrode extend over two different lengths, respectively.

The lateral axis may notably be perpendicular to the longitudinal axis.

The stack may be formed on a transparent carrier.

The emission points are preferably distributed in such a way as to form subsets, the emission points of a given subset being formed by a group of electrodes superposed on a group of light guides, such that each electrode of the group of electrodes is configured to modulate the diffraction gratings coupled to various light guides of the group of light guides. The emission points of a given subset are configured to emit a light wave with the same wave vector. The number of emission points of each subset is preferably higher than 40.

The device may comprise a holographic film, subdivided into various elementary regions, each elementary region being associated with one diffraction grating, and configured to emit a light wave, along an emission axis, under the effect of light extracted by the diffraction grating with which said region is associated, each association between one elementary region and one diffraction grating forming one point of emission of light along the emission axis.

Another subject of the invention is a pair of glasses, comprising lenses, the glasses comprising a device according to the first subject of the invention, the stack being formed on at least one lens of the glasses.

The invention will be better understood on reading the description of the examples of embodiment, which are described, in the rest of the description, with reference to the figures listed below.

FIGURES

FIG. 4A shows the number of emission points (y-axis) as a function of the angle of inclination of the light guides and the electrodes (x-axis), taking into account a number of peaks equal to 25. FIG. 4A is a result of modelling of one example of embodiment.

FIG. 4B illustrates a point spread function of a device according to the invention. FIG. 4B allows figures of merit of the device to be illustrated.

FIG. 4C shows a variation in a parameter, designated by the term "gamma", representative of a formed image quality. In FIG. 4C, the parameter gamma (y-axis) was simulated for various numbers of peaks (x-axis) and various angles of inclination of the light guides and of the electrodes, according to the example of embodiment considered in FIG. 4A.

FIG. 4D shows a variation in a signal-to-noise ratio representative of the quality of an image formed by a device according to the invention. In FIG. 4D, the signal-to-noise ratio (y-axis) was simulated for various numbers of peaks (x-axis) and various angles of inclination of the light guides and of the electrodes.

DESCRIPTION OF PARTICULAR EMBODIMENTS

Figure 1A:
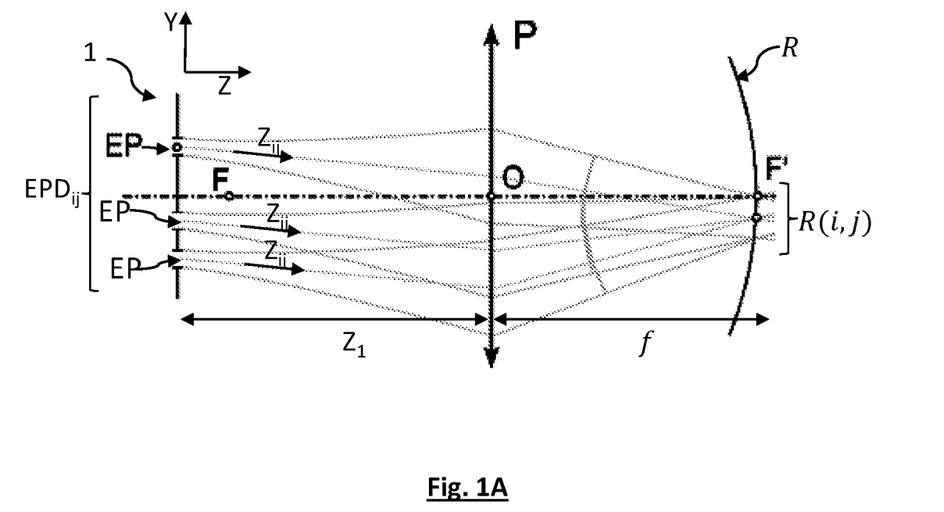
FIG. 1A schematically shows the principle of self-focusing of emission points on a retina of a user.
Figure 1B:
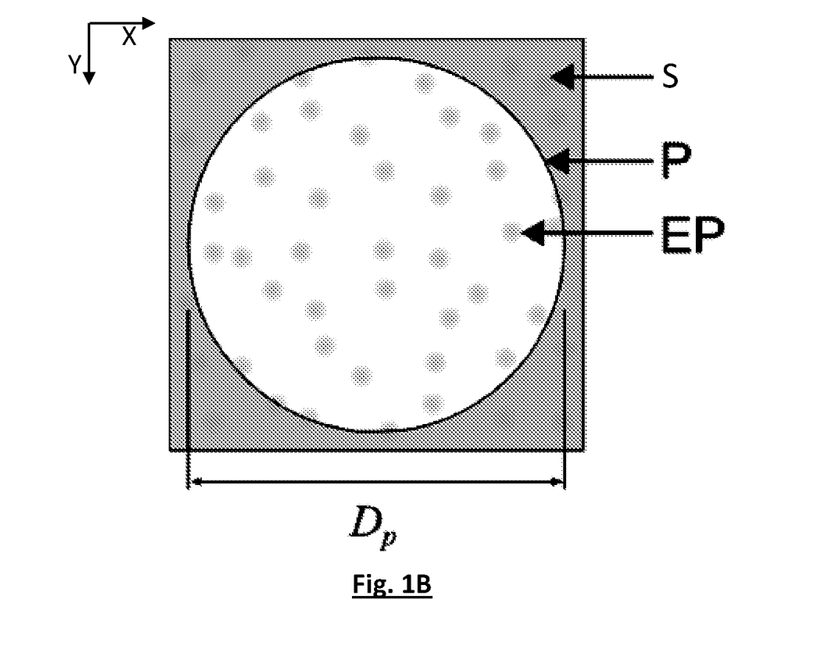
FIG. 1B shows one example of a subset of emission points distributed over an emission area.
Figure 1C:
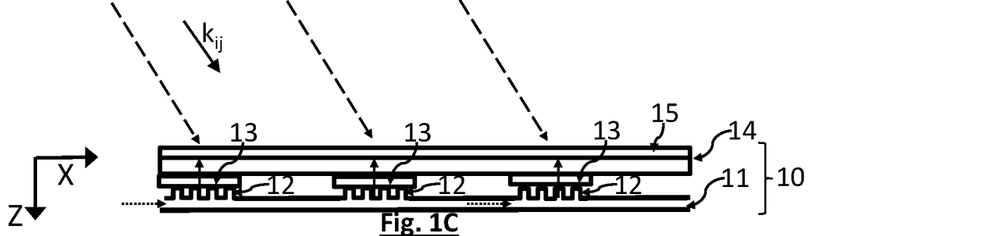
FIG. 1C illustrates a step of recording holograms on a holographic film.

FIGS. 1A to 1C illustrate the principles on which the invention is based. These principles are described in the publication Martinez C, "See-through holographic retinal projection display concept", Optica, Vol. 5, No. 10, October 2018. A projecting device 1 is placed facing a pupil P of an eye, said pupil focusing light onto the retina R of the eye. The projecting device comprises an emission area S, formed from a holographic film. The emission area S is formed from a set of emission points EP, each emission point corresponding to one elementary region of the holographic film capable of being illuminated, coherently, by an illuminating structure, the latter being described with reference to FIG. 1C. The emission area is placed at a distance $Z_1$ from the pupil P. The pupil P is placed at the focal length f of the retina R. An object focal point F and an image focal point F' have been shown.

Each emission point EP is configured to emit light along an emission axis $Z_{ij}$ towards the pupil P. The emission points EP are distributed into various subsets $EPD_{ij}$, (distribution of emission points) such that the emission points of a given subset all emit light parallel to the same emission axis. As described with regard to the prior art, it is advantageous for the emission points EP of a given subset $EPD_{ij}$ to be distributed pseudo-randomly over the emission area S. FIG.

1B shows a subset of emission points configured to emit light that propagates, towards the pupil P, parallel to the same axis $Z_{ij}$.

As shown in FIG. 1A, each emission point EP is configured to emit, when illuminated by a coherent illumination, a light wave that propagates with a wave vector $\vec{k}_{ij}$ towards the pupil P. When the illumination of each emission point EP is temporally coherent, the light waves respectively emitted by the various emission points of a given subset $EPD_{ij}$ propagate with the same wave vector $\vec{k}_{ij}$, coherently, to the pupil P. The phase relationship between the various light waves, respectively emitted by the emission points of a given subset, allows a plane wave or, more generally, a wave the wavefront of which is controllable, to be formed. Thus, the wavefront may have a plane shape, or even a spherical or parabolic shape. Downstream of the pupil, each light wave of given wave vector $\vec{k}_{ij}$ converges substantially on the same point R(i,j) on the retina R.

The projecting device 1 thus allows an image to be formed, on the retina R, the image being discretized into a plurality of pixels R(i,j), each pixel R(i,j) corresponding to the pixel of an image formed, by the projecting device 1, on the retina R.

The light intensity of the pixel R(i,j) results from the contribution of each light wave, of given wave vector $\vec{k}_{ij}$, delivered by each emission point EP of a given subset $EPD_{ij}$. The index ij corresponds to an angular coordinate of the light wave which, after focusing by the pupil (or self-focusing), converges on the pixel R(i,j) on the retina.

The emission area is discretized into various subsets $EPD_{ij}$, each subset comprising a plurality of emission points EP that are distributed over the emission area, each subset being associated with a given angular direction of propagation, given by the wave vector $\vec{k}_{ij}$, towards the pupil.

FIG. 1C schematically shows the structure of the projecting device 1. The projecting device is formed from a plurality of transparent layers that are superposed on one another. The projecting device comprises:
- a first layer, in which light guides 11 are formed. The light guides are configured to receive coherent light, emitted by a laser source described below, and to propagate the coherent light over the length of the emission area S. The light guides may for example be formed from SiN (silicon nitride) deposited on glass. They may extend over a thickness and a width comprised between 200 nm and 300 nm.
- a second layer, in which diffraction gratings 12 are formed, such that each diffraction grating 12 is coupled to one light guide 11. The diffraction gratings 12 are electrically modulated. Each diffraction grating 12 corresponds to a periodic variation in refractive index, capable of being electrically modulated. The diffraction gratings 12 coupled to a given light guide 11 are spaced apart from one another over the length of the light guide, and are considered to be point-like. Each diffraction grating 12 may be formed from inclusions, defining a periodic pattern, in silicon oxide ($SiO_2$), each inclusion being formed from a material the refractive index of which is electrically modulatable, for example a liquid-crystal. When the wavelength of the light is 532 nm, the period of the pattern of the diffraction grating 12 may be comprised between 300 nm and 400 nm. A diffraction grating may be made up of 10 periodic patterns, and thus extend over a length of 3 or 4 µm.
- a third layer, in which transparent electrodes 13 are formed, the electrodes being configured to electrically modulate the refractive index of a material forming the diffraction gratings. The transparent electrodes may be formed from a transparent conductive material, for example ITO (indium tin oxide). Each electrode may thus activate one diffraction grating under the effect of electrical modulation.
- a fourth layer, corresponding to a holographic film 14. By holographic film, what is meant is a photosensitive medium capable of recording a hologram. The holographic film is assumed to be thin enough to be assimilated with the emission area. The holographic film may be a photopolymer, for example polymethyl methacrylate, or a photoresist.

The stack 10 is preferably formed on a transparent carrier 15. It may for example be a question of a carrier made of glass or of polycarbonate. The carrier 15 may be a visor or a lens of a pair of glasses.

Under the effect of biasing by an electrode 13, each point-like diffraction grating 12 is activated, in the sense that it allows some of the light propagating through a light guide 11 to which the diffraction grating 12 is coupled to be extracted. The extracted light propagates towards a holographic film 14, and more precisely towards an elementary region of the holographic film 14. Under the effect of the illumination, the elementary region of the holographic film forms an emission point EP, which emits a light wave with a predetermined wave vector and a predetermined phase shift. The phase of the light wave emitted by the emission point depends on phase information stored in the holographic film, as described below. The light waves emitted by various emission points EP of a given subset $EPD_{ij}$ are out of phase with respect to one another so that all of these light waves together form a coherent wave, a plane wave for example, that propagates towards the pupil.

Thus, each emission point EP corresponds to a superposition, parallel to the emission area, of a point-like diffraction grating 12 coupled to a light guide 11, and of an electrode 13, facing an elementary region of the holographic film 14. The association between each electrode 13 and each diffraction grating 12 forms a structure for extracting some of the light propagating through a light guide 11.

The light guides 11 are arranged parallel to the emission area S. The same goes for the electrodes 13. Thus, the electrodes 13 are superposed on the light guides 11. Parallel to the emission area S, each electrode "crosses" a plurality of light guides, so as to define a plurality of intersections, each intersection corresponding to a position of one emission point EP. The term "to cross" is to be understood to designate a superposition of an electrode and of a light guide. In FIG. 1C, for the sake of simplicity, one light guide 11 coupled to three diffraction gratings 12 have been shown, the latter being connected to three different electrodes 13, the latter being oriented perpendicular to the light guide 11.

A hologram has been recorded beforehand on the holographic film 14. As known, a hologram is formed by interference between two light waves emitted by a coherent light source: an object light wave and a reference light wave. The interference fringes generated are physically or chemically memorized in the holographic film 14. In the recording phase, light extracted from a light guide 11 acts as reference beam. In FIG. 1C:
- light emitted by the laser source and propagating through a light guide 11 has been represented by dashed arrows;
- light extracted from each light guide 11, by three diffraction gratings 12, respectively, under the effect of an activation by the three electrodes 13, has been represented by dash-dotted arrows.

The object beam is a beam that propagates towards the holographic film with a wave vector $\vec{k}_{ij}$, so as to converge on a point R(i,j) of the retina via self-focusing. In the recording step, the object beam may be emitted by a collimated source.

In FIG. 1C, three object beams have been shown propagating in the same direction of propagation $\vec{k}_{ij}$, which has been shown by dashed arrows. The direction of propagation is determined by the hologram. The object beams and each reference beam are emitted by the same laser source. The recording phase consists in storing holograms, in various elementary regions of the holographic film 14, each recording resulting from interference between one object beam, propagating in a predetermined direction $\vec{k}_{ij}$, and one reference beam extracted from one light guide. During the recording:

various elementary regions of the holographic film 14 are exposed to an object beam of given direction of propagation $\vec{k}_{ij}$, so as to form a subset $EPD_{ij}$ of emission points EP corresponding to the same direction of propagation. During this exposure, the emission points of the subset $EPD_{ij}$ are illuminated with the reference beam, the latter being extracted from the light guides. The other elementary regions of the holographic film 14, which are located facing points belonging to other subsets, are masked.

various elementary regions of the holographic film 14 are respectively exposed to various object beams propagating in various directions, so as to form emission points associated with different emission directions.

Figure 1D:
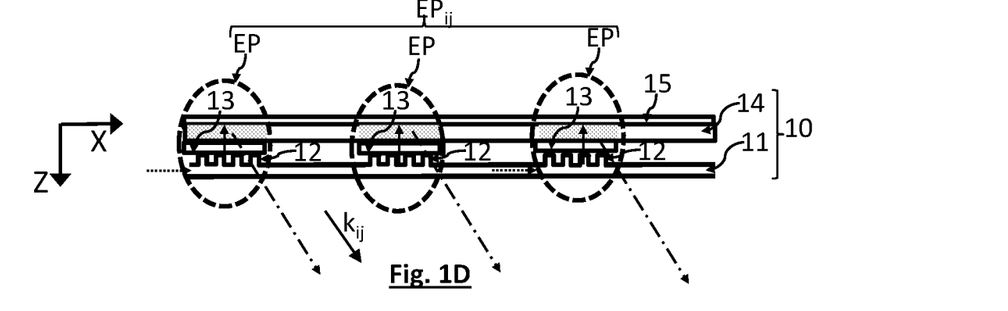
FIG. 1D illustrates a step of emitting a light wave via emission points formed on the device.

FIG. 1D illustrates the phase of use of the device 1. In this figure, the elementary regions of the holographic film 14 that recorded a hologram in the hologram-recording step have been shown in grey. Under the effect of an activation by the electrodes 13, some of the laser light propagating through the light guide 11 is extracted and propagates towards the holographic film 14, as described with reference to FIG. 1C. Under the effect of the extracted illumination, each hologram stored in the photosensitive film diffracts a wave that corresponds to the object wave at the time of recording, and in particular to the direction of propagation $\vec{k}_{ij}$. The diffracted wave has been represented by dash-dotted arrows in FIG. 1D. During use of the device:

the emission points EP corresponding to a given subset $EPD_{ij}$, associated with a given direction of propagation $\vec{k}_{ij}$, are activated simultaneously: coherent diffracted waves that propagate towards the pupil P, with the same wave vector $\vec{k}_{ij}$, are thus formed: the diffracted waves converge on the same pixel R(i,j) on the retina. This subset, resulting from the superposition of the light guides 11 and of the electrodes 13, is defined by the choice of a spatial distribution of light guides and of electrodes.

Simultaneously, another array $EPD_{i',j'}$ may produce coherent diffracted waves that propagate towards the pupil P, with the same wave vector $\vec{k}_{i',j'}$, the diffracted waves converging on one pixel R(i',j') in the image formed on the retina, the emission points of the array $EPD_{i',j'}$ being illuminated by light extracted from other light guides illuminated by another laser source and activated by the same group of electrodes.

Emission points EP of various subsets $EPD_{ij}$ may be activated sequentially, so as to cause sequential convergence on various pixels on the retina.

The electrodes 13 and the light guides 11 are distributed in such a way as to form groups. A subset $EPD_{ij}$ corresponds to emission points EP formed by a superposition of the electrodes of a group of electrodes on light guides of the group of light guides. Thus, each subset $EPD_{ij}$, forming a pixel R(i,j), is associated with a single group of light guides 11 and with a single group of electrodes 13.

As mentioned above, because of persistence of vision, when the activation frequency of the various subsets is sufficiently high, the user perceives an image formed by the various pixels R(i,j).

If $N_{las}$ designates the number of different laser sources used simultaneously, and able to illuminate different groups of light guides, it is possible to simultaneously form $N_{las}$ pixels (i.e. $N_{las}$ subsets $EPD_{ij}$) following activation of a given group of electrodes. If $N_{el}$ designates the number of successively activated different groups of electrodes, under the effect of persistence of vision the user is able to perceive an image, formed on his retina, of $N_{el} \times N_{las}$ pixels.

The position of each emission point EP of a given subset $EPD_{ij}$ is defined by activating some of the electrodes 13 and propagating light through some of the light guides 11.

The design of a projecting device such as described above is subject to size constraints: the diameter $D_p$ of a pupil is considered to be of the order of 4 mm. Moreover, the emission area S is larger than the area of a pupil, and hence the eye may move with respect to the area, without degradation of the image formed on the retina being perceived.

Another requirement is with regards to the density of the emission points. Each pixel R(i,j) of the image projected onto the retina corresponds to a subset $EPD_{ij}$ of emission points EP that is associated with a given direction of propagation $\vec{k}_{ij}$. The higher the number of emission points EP contributing to the same pixel, the higher the quality of the pixel. The number of emission points of a given subset is preferably higher than 40, or even higher than 55 or 60.

Moreover, the number of subsets of the emission points $EPD_{ij}$ corresponds to the number of pixels R(i,j) formed in the image. In order to increase the number of pixels in the image formed on the retina, it is necessary to increase the number of subsets $EPD_{ij}$ respectively associated with various directions of propagation $\vec{k}_{ij}$.

The density of the emission points EP is however limited by design constraints: in order to avoid optical coupling between two adjacent light guides, a spacing $d_{min}$, for example equal to 1.5 μm, must be maintained. The width of an electrode is of the order of magnitude of the size of a diffraction grating, i.e. comprised between 3 and 4 μm, this corresponding to 10 periods of a diffraction grating. Thus, the centre-to-centre spacing $d'_{min}$ between two adjacent electrodes is larger than or equal to 3 or 4 μm. In order to multiply the number of emission points, it is necessary to bring adjacent light guides and adjacent electrodes closer to one another, while meeting minimum spacing constraints.

An emission point EP is obtained at an intersection, or more exactly a superposition, between an electrode 13 and a light guide 11. Considering a configuration in which the electrodes and light guides are orthogonal, forming a grid (parallel rows of light guides, parallel columns of electrodes), the total number of emission points that form the image is such that:

$$N = \frac{S_{pup}}{d_{min}d'_{min}} \quad (2)$$

where $S_{pup}$ corresponds to the area of the pupil.
The maximum density of the emission points is such that:

$$\mathcal{D} = \frac{1}{d_{min}d'_{min}} \quad (3)$$

However, as described in the prior art, for example in U.S. Pat. No. 9,632,317, when the light guides and electrodes are placed perpendicular to one another, such as to form rows and columns, the emission points EP are regularly distributed. The spatial periodicity of the emission points leads to a degradation of the formed image.

Figure 2A:
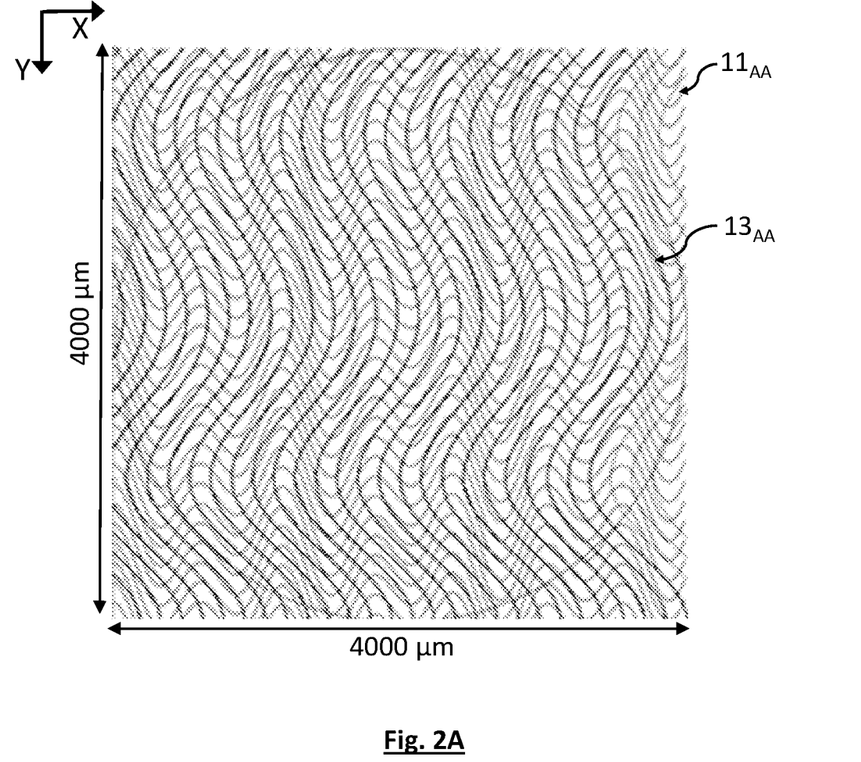
FIG. 2A corresponds to an arrangement of light guides and of electrodes according to the prior art.

FIG. 2A illustrates an arrangement of electrodes and of light guides such as described in U.S. Pat. No. 9,632,317. In this arrangement:
- the light guides $11_{AA}$ describe sinusoidal curves, along a longitudinal axis X. Two adjacent light guides are translated with respect to each other, perpendicular to the axis X.
- the electrodes $13_{AA}$ describe, on a surface parallel to the emission area, sinusoidal curves, along a lateral axis Y. Two adjacent electrodes are translated with respect to each other, perpendicular to the axis Y.

Figure 2B:
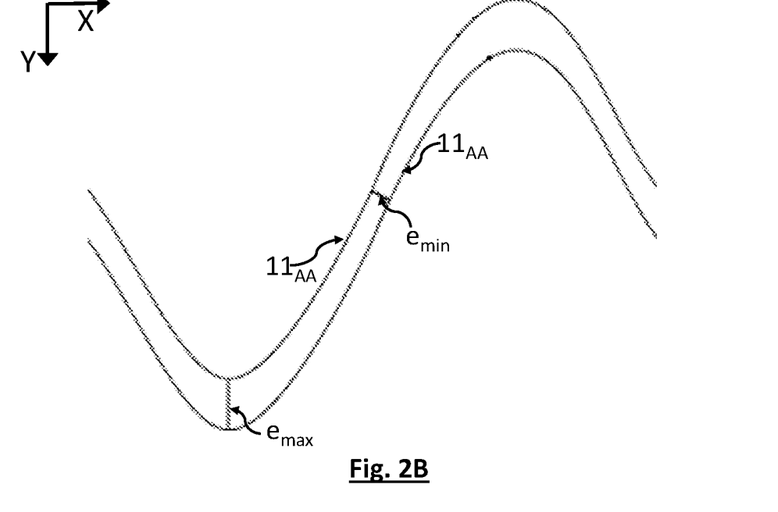
FIG. 2B shows two adjacent light guides, in a configuration such as described with reference to FIG. 2A.

One drawback of the structure described with reference to FIG. 2A results from a variable spacing between two adjacent light guides (or between two adjacent electrodes). In FIG. 2B, it may be seen that the spacing may pass from a minimum value $e_{min}$ to a maximum value $e_{max}$, the maximum spacing corresponding to a distance of translation perpendicular to the axis X. This variation between the minimum spacing $e_{min}$ and the distance of translation $e_{max}$ decreases the density of the emission points.

Figure 3A:
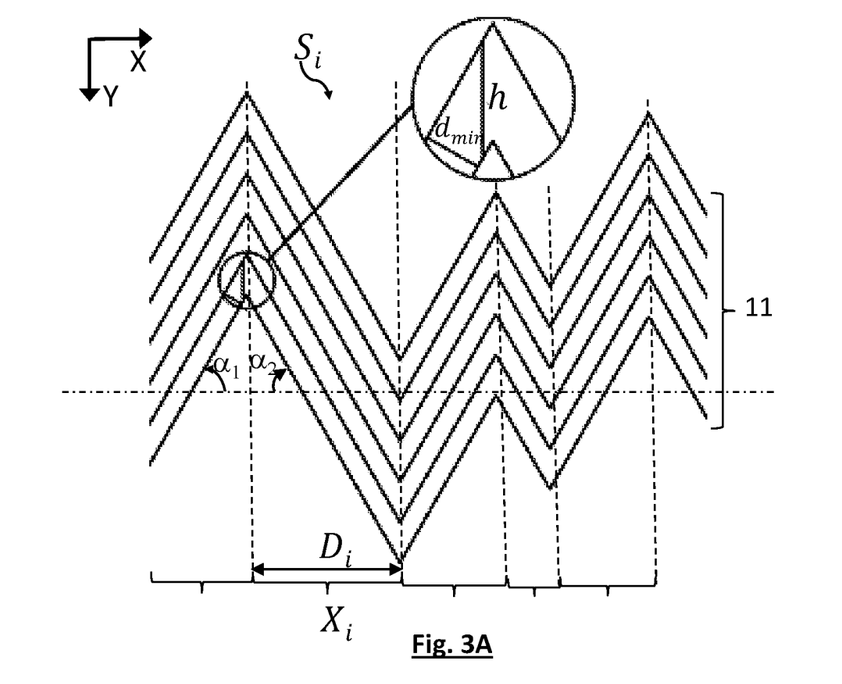
FIG. 3A shows one example of distribution of light guides according to the invention.

The inventors propose another configuration, allowing the density of emission points to be increased, so as to get closer to the density given by (3). In this configuration, each light guide comprises a succession of rectilinear segments. Each rectilinear segment is inclined by an acute angle $\alpha$ to a longitudinal axis X. Along each light guide, the acute angle $\alpha$ is sometimes positive, sometimes negative. In this way, each light guide extends from one side to the other of an axis of extension parallel to the longitudinal axis X. In FIG. 3A, the axis of extension, from one side to the other of which the light guides extend, has been represented by a dash-dotted line.

In FIG. 3A, an example of light guides forming rectilinear segments, and for which the angle $\alpha$ is alternatively positive and negative, has been shown. By angle of inclination, what is meant is the acute angle between the longitudinal axis X and the light guide. A negative first angle $\alpha_1$ and a positive second angle $\alpha_2$ have been shown. As described below, it is preferable for the absolute value of the angle $\alpha$ to be preferably comprised between 25° and 45°, and more preferably between 30° and 40°.

Thus, each light guide extends such as to form rectilinear segments, two successive rectilinear segments of a given light guide making two different acute angles to the longitudinal axis X, respectively. It may be a question of an acute angle that remains the same in absolute value, but that is alternatively positive or negative.

The rectilinear segments of two adjacent light guides are translated with respect to each other in a direction perpendicular to the longitudinal axis X. The distance of translation h between two adjacent light guides is such that:

$$h \geq \frac{d_{min}}{\cos(\alpha)} \quad (4)$$

where $d_{min}$ is the minimum spacing between two adjacent light guides.

In order to maximize the number of emission points EP, it is preferable for the distance of translation to be as small as possible, while respecting the minimum spacing. This corresponds to:

$$h = \frac{d_{min}}{\cos(\alpha)} \quad (5)$$

The higher the absolute value of the angle of inclination, the larger the distance of translation h, perpendicular to the longitudinal axis X. The minimum spacing $d_{min}$ is for example 1.5 µm.

In such a configuration, the longitudinal axis X along which the light guides 11 extend may be subdivided virtually into longitudinal slices $X_i$, the longitudinal slices following one after the other along the longitudinal axis X. In FIG. 3A, each longitudinal slice has been marked by one curly bracket. The emission area may be divided virtually into longitudinal strips $S_i$, each longitudinal strip extending perpendicular to one longitudinal slice $X_i$. In each longitudinal strip $S_i$, the rectilinear segments of the light guides 11 are inclined by the same angle $\alpha$ with respect to the longitudinal axis X, and translated with respect to one another in a direction perpendicular to the longitudinal axis. Thus, in each longitudinal strip $S_i$, the rectilinear segments of the light guides are parallel to one another. In FIG. 3A, the longitudinal strips have been marked by dashed lines. The distance of translation h between two adjacent rectilinear segments of light guides is preferably identical for all of the light guides, and respects expression (4) and preferably expression (5).

Preferably, along each light guide 11, the absolute value of the angle of inclination $\alpha$ is identical.

Preferably, the length of each rectilinear segment is determined randomly, between a predefined minimum limit and a predefined maximum limit. Thus, at least two rectilinear segments of a given light guide, or even most of the rectilinear segments of a given light guide, have different lengths. By most of the segments, what is meant is at least 50% or 80% or 90% of the segments. The fact that the length of each rectilinear segment of the light guides is determined randomly promotes random distribution of the emission points EP, this improving the quality of the images. As described below, it is possible to randomly determine the length $D_i$ of each longitudinal slice $X_i$, along the axis X, this amounting, since the angle $\alpha$ is known, to defining the length of each rectilinear segment of the light guides.

Figure 3B:
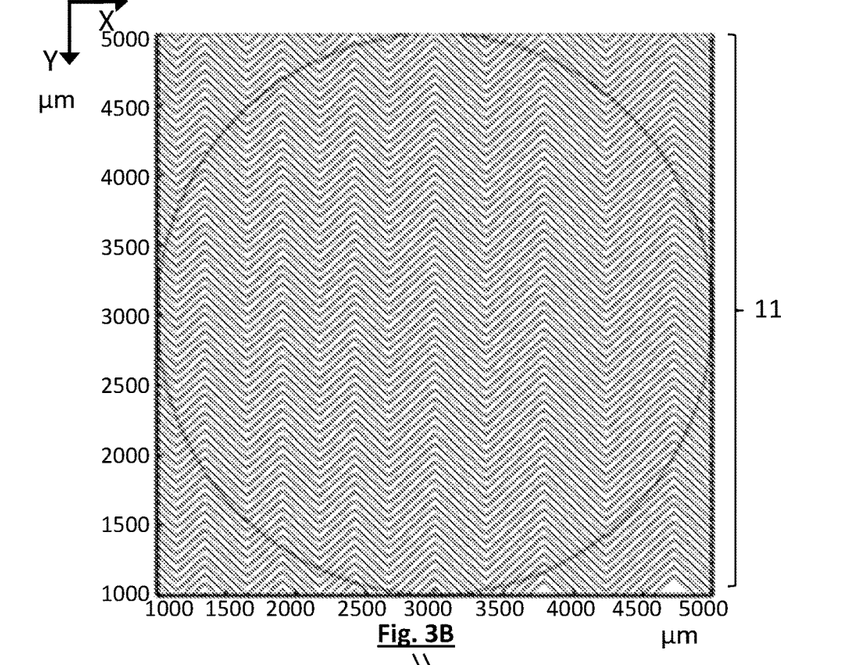
FIG. 3B shows another example of distribution of light guides according to the invention.

FIG. 3B shows one example of distribution of light guides 11 according to one embodiment. A pupil diameter of 4 mm has been shown in the figure.

In each light guide, the interface between two rectilinear segments of different inclinations must be rounded, so as to facilitate the guidance of light through the interior of the light guide. Thus, two successive rectilinear segments do not necessarily join, but are rather connected to each other by a rounded junction.

Figure 3C:
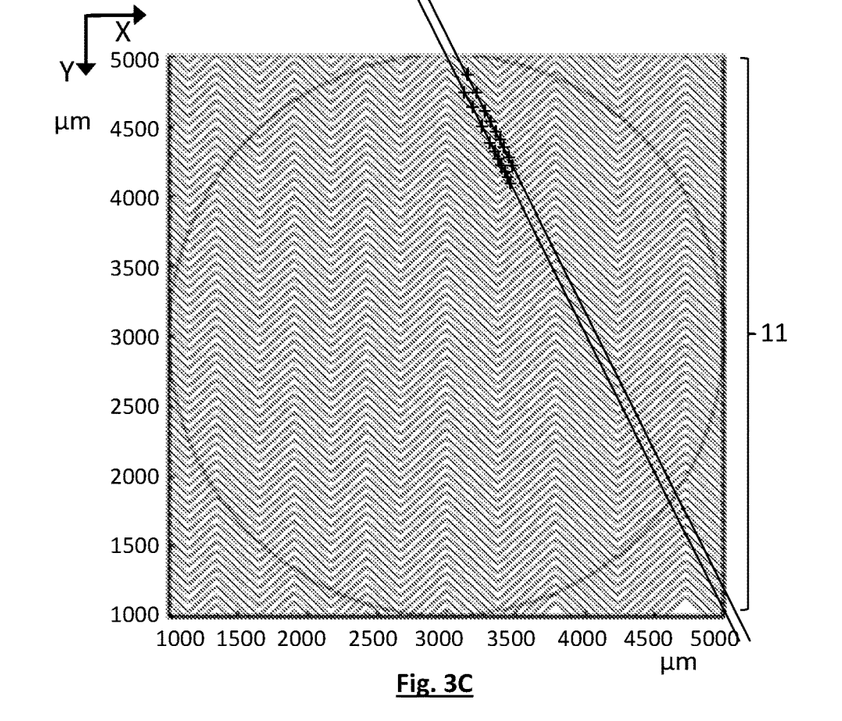
FIG. 3C shows one possibility as regards distribution of electrodes over the light guides schematically shown in FIG. 3B.

FIG. 3C shows the structure of the light guides 11 such as illustrated in FIG. 3B, and a few electrodes 13. Only two electrodes have been shown for the sake of legibility. In this configuration, the electrodes are rectilinear and placed parallel to one another. Each electrode is configured so as to "cross", parallel to the emission area, a plurality of light guides. This allows light propagating through various light guides to be extracted using the same electrode. In FIG. 3C, the positions of emission points EP have been shown, each position being symbolized by one cross.

Figure 3D:
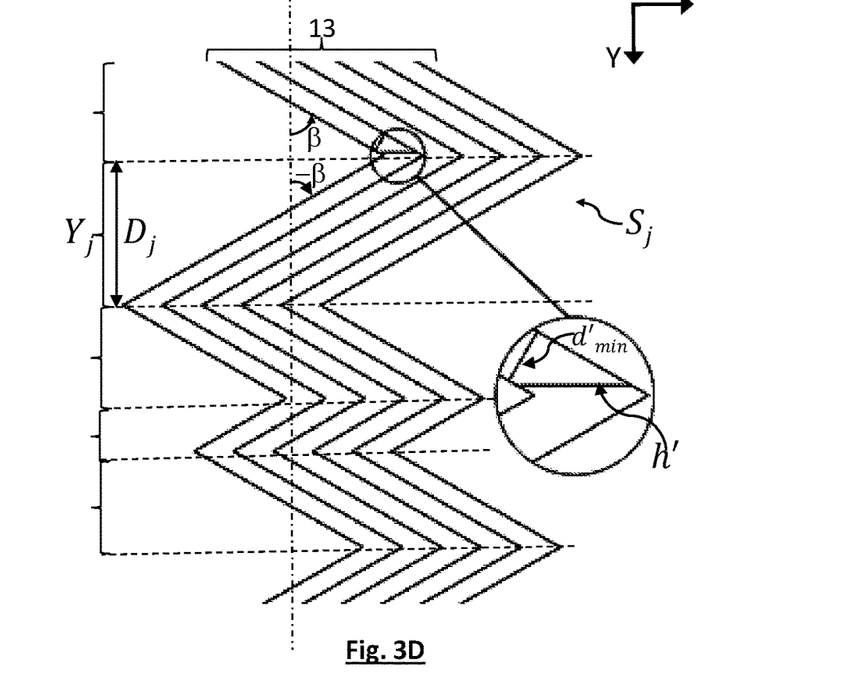
FIG. 3D shows one example of distribution of electrodes according to the invention.

The inventors consider that it is advantageous for the configuration of the electrodes to be similar to the configuration of the light guides, but oriented differently. Thus, just like the light guides, it is preferable for the electrodes 13 to form rectilinear segments that extend parallel to one another, as shown in FIG. 3D. The segments are inclined by an angle of inclination β with respect to a lateral axis Y. Along a given electrode, the angle β may sometimes be positive, sometimes negative. In this way, each electrode 13 extends from one side to the other of an axis parallel to the lateral axis Y. As illustrated in FIG. 3A, with regard to the light guides, the angle of inclination may be alternatively positive and negative. By angle of inclination β, what is meant is the acute angle between the lateral axis Y and the electrode. As described below, it is preferable for the absolute value of the angle β to be preferably comprised between 25° and 45°, and more preferably between 30° and 40°.

In such a configuration, the lateral axis Y may be subdivided virtually into lateral slices $Y_j$, the lateral slices following one after another along the lateral axis Y. Two successive rectilinear segments of a given electrode 13 make two different acute angles to the lateral axis Y, respectively. It may be a question of an acute angle that remains the same in absolute value, but that is alternatively positive or negative.

In FIG. 3D, each lateral slice $Y_j$ has been marked by one curly bracket. The emission area may be divided virtually into lateral strips $S_j$, each lateral strip extending perpendicular to one lateral slice $Y_j$. In each lateral strip $S_j$, the rectilinear segments of the electrodes are inclined by the same angle β with respect to the lateral axis Y, and translated with respect to one another in a direction perpendicular to the lateral axis. Thus, in each lateral strip $S_j$, the rectilinear segments of the electrodes are parallel to one another and inclined by the same angle β with respect to the lateral axis Y. In FIG. 3D, the lateral strips have been marked by dashed lines.

The rectilinear segments of two adjacent electrodes are translated with respect to each other in a direction perpendicular to the lateral axis Y. The distance of translation h' between two adjacent electrodes is such that:

$$h' \geq \frac{d'_{min}}{\cos(\beta)} \quad (4')$$

where $d'_{min}$ is the minimum spacing between two adjacent electrodes.

In order to maximize the number of emission points EP, it is preferable for the distance of translation to be as small as possible, while respecting the minimum spacing. This corresponds to:

$$h' = \frac{d'_{min}}{\cos(\beta)} \quad (5')$$

The higher the absolute value of the angle of inclination, the larger the distance of translation h', perpendicular to the lateral axis. The minimum spacing $d'_{min}$ is for example 4 μm.

Preferably, the length of each rectilinear segment of electrode is determined randomly, between a predefined minimum limit and a predefined maximum limit. Thus, at least two rectilinear segments of a given electrode, or even most of the rectilinear segments of a given electrode, have different lengths. By most of the segments, what is meant is at least 50% or 80% or 90% of the segments. As explained with regard to the light guides, the fact that the length of each rectilinear segment of an electrode is determined randomly promotes random distribution of the emission points EP, this improving the quality of the images.

Generally, the lateral axis Y is secant to the longitudinal axis X. The lateral axis Y may for example be perpendicular to the longitudinal axis X.

Figure 3E:
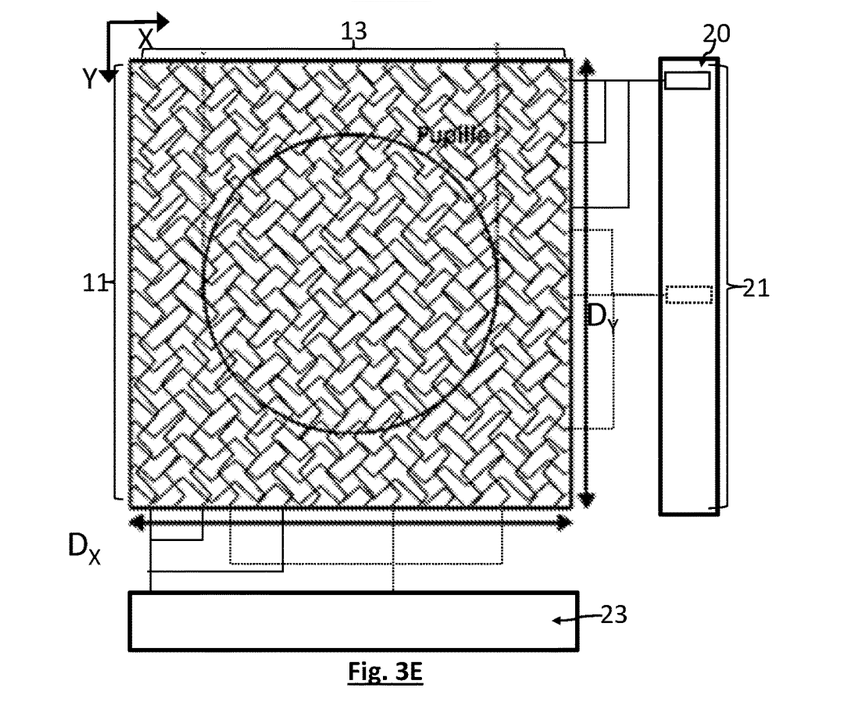
FIG. 3E illustrates one distribution of light guides and of electrodes according to the invention.

FIG. 3E shows a superposition of an array of light guides and of an array of electrodes, in which the longitudinal axis X is perpendicular to the lateral axis Y. In this configuration:

Each light guide 11 extends between two opposite borders along the longitudinal axis X and each electrode extends between two opposite borders along the lateral axis Y.

Each light guide 11 extends in rectilinear segments in such a way as to make various angles α to the longitudinal axis X, with an alternation of positive and negative acute angles. In this example, the absolute value of a is identical for each segment, the angle α being alternatively positive and negative. Two adjacent light guides are translated with respect to each other over a height h, such as given by (5), perpendicular to the longitudinal axis X.

Each electrode 13 extends in rectilinear segments in such a way as to make various angles β to the lateral axis Y, with an alternation of positive and negative angles. In this example, the absolute value of β is identical for each segment. Two adjacent electrodes are translated with respect to each other over a height h', such as given by (5'), perpendicular to the lateral axis Y.

For each rectilinear segment of electrode 13 or of light guide 11, |β|=|α|.

In FIG. 3E, a light-controlling unit 20 allowing laser light to be selectively addressed to each light guide 11 has also been shown. Preferably, the light-controlling unit 20 may comprise laser sources 21, each laser source being optically coupled to a plurality of light guides 11. Each laser source 21 may be activated independently of the others. As mentioned above, $N_{las}$ different laser sources 21 that are able to be activated simultaneously are provided. FIG. 3E shows two laser sources 20 and their respective couplings, in solid and dashed lines.

In FIG. 3E, an electrode-controlling unit 23 allowing each electrode 13 to be selectively biased has also been shown. Preferably, a plurality of electrodes are simultaneously activatable, these forming groups of electrodes. There are $N_{el}$ groups of electrodes 13. FIG. 3E shows two groups of electrodes and their respective couplings, in solid and dashed lines.

Each emission point EP is placed at the intersection of a light guide and of an electrode. An emission point EP is activated when the light guide is illuminated by laser light and when the electrode is biased, so as to allow light propagating through the light guide to be extracted and a light wave to be emitted by the holographic film 14.

In each subset of emission points $EPD_{ij}$, the distribution of the emission points EP depends on the distribution of the light guides 11 and of the electrodes 13 that are activated simultaneously. Thus, to each subset of emission points $EPD_{ij}$ is assigned one group of light guides and one group of electrodes. Two different subsets are associated with various light guides and/or with various electrodes. A given light guide/electrode association is assigned to a single subgroup.

If $N_X$ and $N_Y$ correspond to the total number of light guides and of electrodes, and if $n_X$ and $n_Y$ correspond to the number of light guides and of electrodes that are activated simultaneously to form a subset of emission points $EPD_{ij}$, each subset of emission points is defined by randomly drawing $n_X$ light guides from the $N_X$ available light guides and $n_Y$ electrodes from the $N_Y$ available electrodes, while meeting the condition that a given light guide/electrode pair can be selected only for one subset. Thus, a group of light guides, containing $n_X$ light guides, and a group of electrodes, containing $n_Y$ electrodes, are formed.

Whether it is a question of light guides or electrodes, the rectilinear segments of a given light guide and of a given electrode may have different lengths. The variation in length of the rectilinear segments of a given waveguide (or of a given electrode) may be ±50% with respect to an average length.

The configuration of each light guide 11, such as shown in FIG. 3E, is obtained taking into account a predetermined value of the angle $\alpha$. Another parameter taken into account is the total number I of rectilinear segments forming a given light guide. The length of each rectilinear segment is then determined randomly or pseudo-randomly.

In FIG. 3E, the light guides 11 extend, parallel to the longitudinal axis X, over a length $D_X$. Let $D_i$ be the length of the projection of a rectilinear segment onto the longitudinal axis X, which length is designated by the term "length along the axis X". Let $v_i$ be a random value comprised between 0 and 1. Each length $D_i$, along the longitudinal axis X, of a segment that: $D_i = D_X/I(1+v_{i+1}-v_i)$ (6) when i=1 ... I−1 where I is the number of successive rectilinear segments along the longitudinal axis X. The length of the rectilinear segment $D_I$ of order I is such that $$D_I = D_X - \sum_{i=1}^{I-1} D_i \quad (6')$$

The same reasoning may be applied to the electrodes, taking into account a total number j of rectilinear segments for a given electrode. The electrodes extend, parallel to the axis Y, over a length $D_Y$. Let $D_j$ be the length of the projection of a segment onto the lateral axis, which length is designated by the term "length along the lateral axis Y". Let $v_j$ be a random value comprised between 0 and 1. Each length of each rectilinear segment, along the lateral axis Y, is such that:

$$D_j = \frac{D_Y}{J}(1 + v_{j+1} - v_j) \quad (7)$$

when j=1 ... J−1 where J is the number of successive rectilinear segments along the lateral axis Y.

$$D_j = D_Y - \Sigma_{j=1}^{J-1} D_j \quad (7')$$

Whatever the embodiment, between two consecutive rectilinear segments, a linking portion must be provided, so as to preserve a radius of curvature allowing a sufficient amount of light to propagate between the two consecutive segments of the light guide. In the linking portion, the light guides have a certain radius of curvature, so as to join the two consecutive rectilinear segments.

Figure 3F:
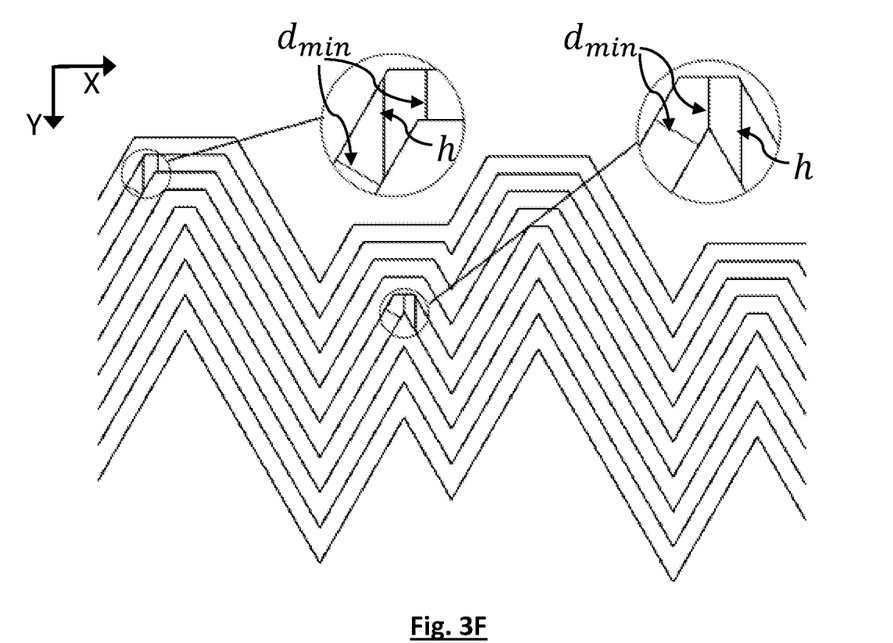
FIG. 3F shows one example of a variant of the invention, in which variant certain light guides may extend locally in a predetermined direction, for example parallel to a border.

FIG. 3F shows one variant embodiment: between two consecutive inclined rectilinear segments, a portion is inserted parallel to the longitudinal axis X, or, more generally, parallel to a border of the emission area. Such a configuration allows the shape of the light guides to be tailored to the shape of the emission area, in particular in the vicinity of singularities, such as borders, of the emission area.

The inventors have evaluated the performance of the device 1 such as described with reference to FIGS. 3A to 3F, using simulations. These simulations were performed using B-splines.

Figure 4A:
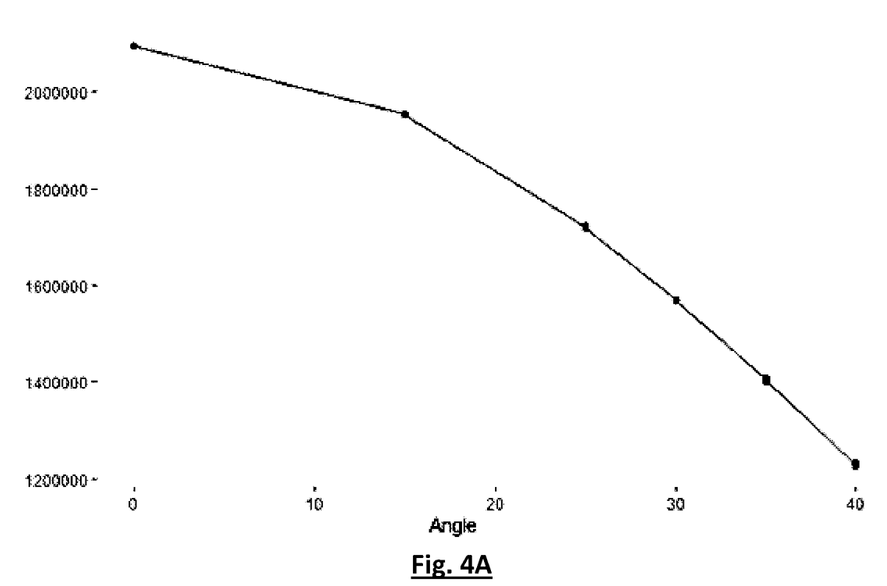

In a first simulation, the number of emission points as a function of the angle $\alpha$ and of the number of peaks was estimated, the number of peaks corresponding to the number of segments minus one. A peak corresponds to a junction between two consecutive segments. FIG. 4A shows the number of emission points (y-axis) as a function of angle (x-axis—units degrees) considering the number of peaks to be set to 25. FIG. 4A was plotted for an arrangement of the light guides and of the electrodes such as described with reference to FIG. 3E, with $|\beta|=|\alpha|$. Moreover, a number $n_X$ of light guides equal to 9 and a number $n_Y$ of electrodes equal to 10 were taken into account.

FIG. 4A shows that as the angle increases, the number of emission points decreases. It will be recalled that the configuration $\alpha=0$ corresponds to a situation in which the light guides and the electrodes are arranged in a regular orthogonal grid. Such an arrangement is unacceptable, because the periodicity of the grid results in a noisy image that is difficult to exploit. Expression (5) explains the correlation between the number of emission points and angle: The higher $\alpha$ becomes, the larger the height of translation h between two adjacent light guides, this decreasing the number of light guides that it is possible to place in a given area. The same goes for the electrodes, given expression (5').

Simulation of Performance in Terms of Image Quality

The inventors have defined two criteria for quantifying the quality of the image formed, on the retina, by self-focusing of the emission points of a given subset $EPD_{ij}$.

Figure 4B:
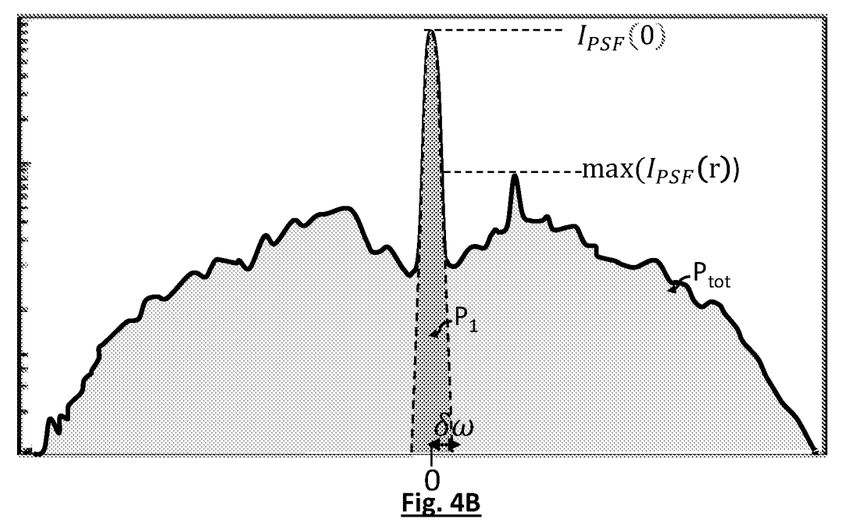

A first criterion is the signal-to-noise ratio SNR of a point spread function (PSF) of the system formed by the emission area, the pupil and the lens. The PSF corresponds to the image of a point on the retina. FIG. 4B illustrates the PSF, in that it shows a spatial distribution of intensity on the retina. In FIG. 4B, the y-axis corresponds to the light intensity $I_{PSF}(r)$ of the image formed on the retina and the x-axis corresponds to a distance r with respect to the origin, the origin corresponding to the position of the point formed on the retina.

The signal-to-noise ratio is such that:

$$SNR = 10 \log_{10}\left(\frac{I_{PSF}(0)}{\max_{r>\delta w}(I_{PSF}(r))}\right) \quad (8)$$

$I_{PSF}(0)$ is the height of the central peak;

$\delta w$ corresponds to the full width at half maximum of the central intensity peak formed about the first zeroes of the Airy pattern. When the system is perfect, the PSF may be modelled by an Airy pattern. The width $\delta w$ corresponds to the width between the apex of the intensity peak and the first "zero" of the Airy pattern;

$$\max_{r>\delta w}(I_{PSF}(r))$$ (5)

is the maximum value of the intensity outside of the central intensity peak.

Assuming a perfect system, the PSF of which may be modelled by an Airy pattern, the SNR is such that:

$$SNR_{Airy} = 10\log_{10}\left(\frac{I_{PSF-Airy}(0)}{I_{PSF-Airy}(r_{max})}\right)$$ (8')

where $I_{PSF-Airy}(0)$ is the height of the central peak of the Airy pattern and $I_{PSF-Airy}(r_{max})$ is the height of the secondary peak of the Airy pattern. It is estimated that $SNR_{Airy} \cong 17.578$ dB A second criterion for quantifying the effectiveness of the self-focusing is the power ratio, which is denoted γ, with:

$$\gamma = -10\log_{10}\left(\frac{P_1}{P_{tot}}\right)$$ (9)

$P_1$ is the power of the central peak, which corresponds to the volume generated by the area of the central peak shown in dark grey in FIG. 4B;

$P_{tot}$ the total luminous power, which corresponds to the volume generated by the total area of FIG. 4B (light grey and dark grey).

It is optimal for the power ratio to be as low as possible, i.e. for $P_1$ to tend to $P_{tot}$.

Assuming a perfect system, the PSF of which may be modelled by an Airy pattern, the power ratio $\gamma_{Airy}$ is such that:

$$\gamma_{Airy} = -10\log_{10}\left(\frac{P_{1-Airy}}{P_{tot-Airy}}\right)$$ (9')

where $P_{1-Airy}$ and $P_{tot-Airy}$ are the respective powers of the central peak and of the entirety of the Airy pattern. It is estimated that $\gamma_{Airy} \cong 0.77$ dB.

Figure 4C:
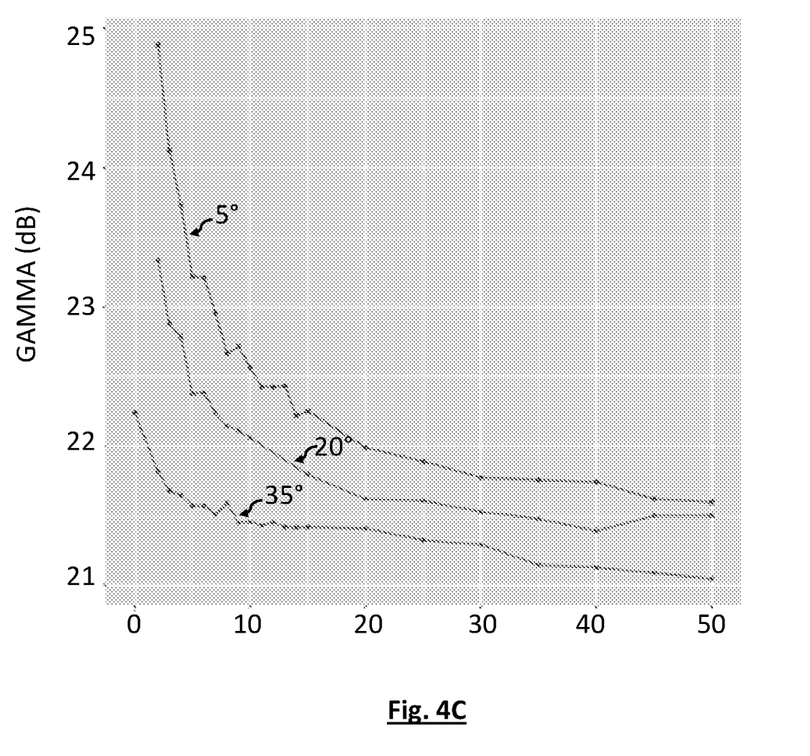

The parameters SNR and y are related to the distribution of the emission points. FIG. 4C shows an estimation of the parameter γ (y-axis—units dB) such as defined in (9), as a function of the number of peaks (x-axis) and for various angles α. The simulation was carried out considering the number of emission points of a given subset to be equal to 55. This means that one pixel of the image formed on the retina is obtained by self-focusing of 55 emission points distributed over the emission area, facing the pupil of the eye. FIG. 4C shows that the parameter γ is relatively insensitive to the number of peaks, provided that the latter exceeds 10. It will be recalled that the number of peaks corresponds to the number of segments minus one.

Figure 4D:
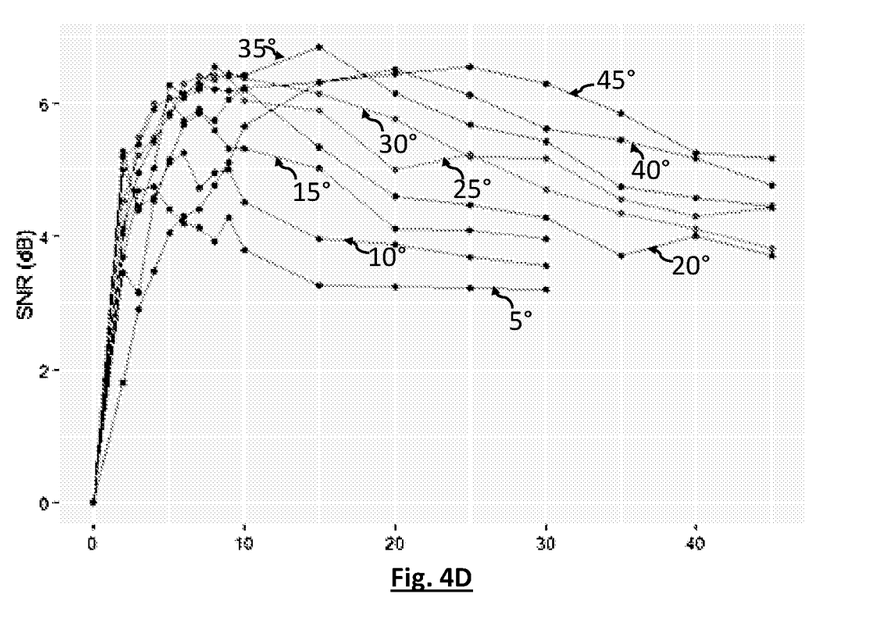

FIG. 4D shows the variation in SNR, such as defined in (8) (y-axis—units dB) as a function of the number of peaks (x-axis) and for various angles α. The simulation was carried out considering the number of emission points of a given subset to be equal to 55. FIG. 4D shows that the optimum number of peaks is higher than 5 and lower than 30, for a length, along the longitudinal axis (or lateral axis) of 6 mm.

FIG. 4D allows an optimal range of angles α that is comprised between 20° and 40°, or even 45° when the number of peaks is higher than 20, and preferably between 25° and 35°, to be defined. FIG. 4D shows that increasing the number of peaks (above 20) is favourable to a configuration in which the angles are high (>30°).

In the embodiment described above, each emission point is formed by a holographic-film portion illuminated by light extracted from one light guide. Other ways of forming an emission point may be envisaged. The holographic film may be replaced by a spatial light modulator (SLM) placed facing a diffraction grating. Contrary to a hologram, an SLM does not deviate the direction of a beam extracted from a light guide by the diffraction grating. The phase relationship imposed by the SLM orients the beam resulting from a coherent sum of the beams respectively emitted by the emission points of a given subset.

Comparative Trial

Two prior-art configurations similar to the configuration described with reference to FIG. 2 have been compared to a configuration according to the invention. Each configuration comprised 9 light guides and 10 electrodes distributed over an area of length $D_X$ and of width $D_Y$ equal to 6000 μm. A pupil of 4000 μm diameter was considered. Subsets of 55 emission points were formed.

In each prior-art configuration, these configurations being based on sinusoidal shapes, each light guide has a sinusoidal shape defined by the function:

$$g(x) = \sum_{p=1}^{P} a_p \cos\left(\frac{2\pi x}{b_p}\right)$$ (10)

where $a_p$ and $b_p$ are real positive numbers, corresponding to amplitudes and periods of the cosine function of expression (10), respectively.

Each electrode has a sinusoidal share defined by the function:

$$g'(y) = \sum_{q=1}^{Q} a'_q \cos\left(\frac{2\pi y}{b'_q}\right)$$ (10')

where $a'_q$ and $b'_q$ are real positive numbers, corresponding to amplitudes and periods of the cosine function of expression (10'), respectively.

The inventors considered two sinusoidal configurations, each configuration being parameterized by four parameters $$\begin{pmatrix} a_p \\ b_p \end{pmatrix}\begin{pmatrix} a'_q \\ b'_q \end{pmatrix}.$$

Each configuration comprised two cosine functions (P=2; Q=2).

Table 1 collates the parameters of each configuration

TABLE 1

|  | 1st configuration | 2nd configuration |
|---|---|---|
| $\begin{pmatrix} a'_q \\ b'_q \end{pmatrix}$ | $\begin{pmatrix} 300 \\ 2200 \end{pmatrix}\begin{pmatrix} 60 \\ 1530 \end{pmatrix}$ | $\begin{pmatrix} 300 \\ 1750 \end{pmatrix}\begin{pmatrix} 350 \\ 1280 \end{pmatrix}$ |

TABLE 1-continued

|  | 1st configuration |  | 2nd configuration |  |
|---|---|---|---|---|
| $\begin{pmatrix} a_p \\ b_p \end{pmatrix}$ | $\begin{pmatrix} 200 \\ 600 \end{pmatrix}$ | $\begin{pmatrix} 140 \\ 1100 \end{pmatrix}$ | $\begin{pmatrix} 100 \\ 1000 \end{pmatrix}$ | $\begin{pmatrix} 150 \\ 1530 \end{pmatrix}$ |

A third configuration was tested, which configuration was representative of the invention and comprised 9 rectilinear segments (and therefore 8 peaks), an angle α=35° being taken into account.

Each configuration was the subject of a random draw, so as to define, for each pixel of the image, groups of light guides and of electrodes to be activated. Each group of light guides and of electrodes that were simultaneously activated allowed subsets to be formed that respectively comprised 55 emission points.

The second configuration was the subject of two random draws. The second random draw forms a configuration designated "2bis".

Table 2 shows the number of emission points obtained in each configuration, the density (number of points per mm$^2$), the number of pixels formed in the image and the size of the image in pixels.

TABLE 2

| Configuration | Number of points | Density | Number of pixels | Size of the image |
|---|---|---|---|---|
| 1 | $4.5 \times 10^5$ | $3.62 \times 10^4$ | 7800 | $78 \times 100$ |
| 2; 2bis | $4.8 \times 10^5$ | $3.79 \times 10^4$ | 8085 | $80 \times 100$ |
| 3 | $14.1 \times 10^5$ | $11.2 \times 10^4$ | 28714 | $287 \times 100$ |

It may be seen that the configuration according to the invention allows a higher number (by a factor higher than 3) of points to be obtained for a given emission area. This allows more than three times more pixels to be obtained in the image, and hence a larger image size. This confirms the advantageousness of placing the light guides and electrodes in the manner described with reference to FIGS. 3A to 3E.

Figure 4E:
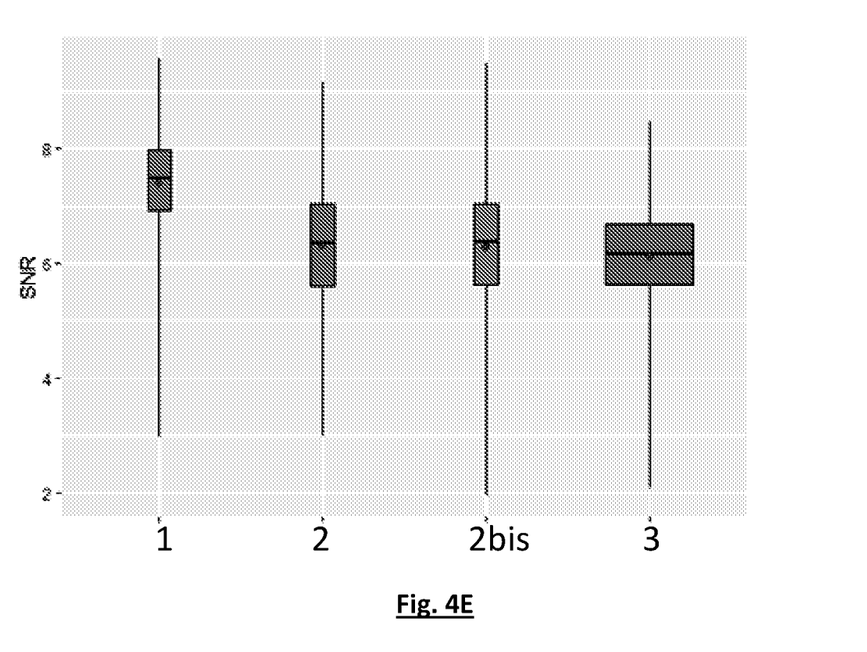
FIG. 4E shows a variability in signal-to-noise ratios (y-axis) for various configurations (x-axis), the variability being represented in the form of a box plot.

The SNR such as defined in (8) was estimated for each pixel of the image. FIG. 4E shows, in each configuration, the average SNR and the dispersion of the SNR values estimated for the various pixels. FIG. 4E is a box plot, showing the average (dot), the median (line at the centre of each rectangle), the 25% and 75% quartiles (horizontal borders of each rectangle), and the minimum and maximum values (ends of each line). The width of each box plot is proportional to the number of pixels formed in the image. It may be seen that implementation of the invention is accompanied by a slight reduction in SNR, the latter remaining at an acceptable level, while a significant increase in the number of pixels is achieved.

The invention will possibly be implemented in wearable augmented-reality devices, in particular glasses, or goggles, or, more generally, on transparent surfaces intended to be placed facing an eye so as to form an image superimposed on the image that the eye perceives through the transparent surface.

The invention claimed is:

1. A device for projecting an image onto an eye, the device comprising a stack comprising:
    light guides, each light guide being coupled to a plurality of diffraction gratings, which are distributed over a length of the light guide, each diffraction grating being electrically modulatable, each diffraction grating being configured to be electrically modulated so as to extract light propagating through the light guide;
    electrodes, each electrode being associated with a plurality of diffraction gratings coupled to various light guides, respectively, each electrode being configured to modulate each diffraction grating with which it is associated; and
    the device comprising various emission points distributed over the length of an emission area, each emission point corresponding to an association between one electrode and one diffraction grating coupled to one light guide,
    wherein:
    each light guide extends in such a way as to form rectilinear segments, two successive rectilinear segments of a given light guide making two different acute angles (α, −α) to a longitudinal axis, respectively;
    rectilinear segments of various light guides are placed parallel to one another, but offset from one another in a direction perpendicular to the longitudinal axis;
    the emission points are distributed in such a way as to form subsets, the emission points of a given subset being formed by a group of electrodes superposed on a group of light guides, such that each electrode of the group of electrodes is configured to modulate the diffraction gratings coupled to various light guides of the group of light guides; and
    the emission points of a given subset are configured to emit a light wave in the same direction.

2. The device according to claim 1, wherein:
    the emission area is bounded by a border,
    rectilinear segments of light guides are parallel to one another, in a direction secant to the border, and
    at least one light guide extends parallel to the border.

3. The device according to claim 1, wherein the acute angles made by two successive rectilinear segments of a light guide, to the longitudinal axis, are of opposite signs.

4. The device according to claim 3, wherein the acute angles made by two successive rectilinear segments of a light guide, to the longitudinal axis have the same absolute value.

5. The device according to claim 1, wherein the acute angle, made by each rectilinear segment of a light guide, to the longitudinal axis, is comprised between 20° and 45° in absolute value.

6. The device according to claim 1, wherein each light guide comprises a density of rectilinear segments comprised between 0.5 and 5 segments per mm along the longitudinal axis.

7. The device according to claim 1, wherein at least two rectilinear segments of a given light guide extend over two different lengths, respectively.

8. The device according to claim 1, wherein:
    each electrode extends in such a way as to form rectilinear segments, two successive rectilinear segments of a given electrode making two different acute angles to a lateral axis, respectively, and
    rectilinear segments of various electrodes are placed parallel to one another, but offset from one another in a direction perpendicular to the lateral axis.

9. The device according to claim 8, wherein:
    the emission area is bounded by a border,
    segments of electrodes are parallel to one another, in a direction secant to the border, and
    at least one electrode extends parallel to the border.

10. The device according to claim 8, wherein the acute angles made by the successive rectilinear segments of an electrode, to the lateral axis, are of opposite signs.

11. The device according to claim 10, wherein the acute angles made by two rectilinear segments of an electrode, to the lateral axis, have the same absolute value.

12. The device according to claim 8, wherein the acute angle, made by each rectilinear segment of an electrode, to the lateral axis, is comprised between 20° and 45° in absolute value.

13. The device according to claim 8, wherein each electrode comprises a density of rectilinear segments comprised between 0.5 and 5 segments per mm along the lateral axis.

14. The device according to claim 8, wherein at least two rectilinear segments of a given electrode extend over two different lengths, respectively.

15. The device according to claim 8, wherein the lateral axis is perpendicular to the longitudinal axis.

16. The device according to claim 1, wherein the stack is formed on a transparent carrier.

17. The device according to claim 1, wherein a number of emission points of each subset is higher than 40.

18. The device according to claim 1, comprising a holographic film, subdivided into various elementary regions, each elementary region being associated with one diffraction grating, and configured to emit a light wave, along an emission axis, under an effect of light extracted by the diffraction grating with which said region is associated, each association between one elementary region and one diffraction grating forming one point of emission of light along the emission axis.

19. Glasses, comprising lenses, the glasses comprising a device according to claim 1, the stack being formed on at least one lens of the glasses.

* * * * *